United States Patent
Peiffer et al.

(10) Patent No.: US 9,169,369 B2
(45) Date of Patent: Oct. 27, 2015

(54) VINYLEPOXIDE-AMINE ACID GAS ADSORPTION-DESORPTION POLYMERS AND OLIGOMERS, PROCESSES FOR PREPARING SAME, AND USES THEREOF

(75) Inventors: Dennis G. Peiffer, Annandale, NJ (US); David C. Calabro, Bridgewater, NJ (US); Quanchang Li, Dayton, NJ (US); Mobae Afeworki, Phillipsburg, NJ (US)

(73) Assignee: ExxonMobil Research and Engineered Company, Annandale, NJ (US)

( * ) Notice: Subject to any disclaimer, the term of this patent is extended or adjusted under 35 U.S.C. 154(b) by 969 days.

(21) Appl. No.: 13/332,512

(22) Filed: Dec. 21, 2011

(65) Prior Publication Data

US 2012/0164044 A1 Jun. 28, 2012

Related U.S. Application Data

(60) Provisional application No. 61/426,232, filed on Dec. 22, 2010.

(51) Int. Cl.
   *C08G 65/26* (2006.01)
   *C07C 211/00* (2006.01)
   *B01J 20/26* (2006.01)
   (Continued)

(52) U.S. Cl.
   CPC . *C08J 9/26* (2013.01); *B01D 53/02* (2013.01); *B01D 53/62* (2013.01); *C08G 73/02* (2013.01); *C08G 73/0206* (2013.01); *C08J 9/28* (2013.01); *B01D 53/047* (2013.01); *B01D 53/0462* (2013.01); *B01D 2253/202* (2013.01); *B01D 2253/311* (2013.01); *B01D 2257/304* (2013.01); *B01D 2257/504* (2013.01); *C08J 2201/026* (2013.01); *C08J 2201/0502* (2013.01); *C08J 2379/02* (2013.01); *Y02C 10/04* (2013.01); *Y02C 10/08* (2013.01); *Y10T 428/2982* (2015.01)

(58) Field of Classification Search
   None
   See application file for complete search history.

(56) References Cited

U.S. PATENT DOCUMENTS

| 2007/0078231 | A1* | 4/2007 | Shibata et al. | 525/329.7 |
| 2007/0149398 | A1 | 6/2007 | Jones et al. | |
| 2011/0226697 | A1* | 9/2011 | McLellan et al. | 210/651 |

OTHER PUBLICATIONS

Xu et al., "Fabrication of Cross-Linked Polyethyleneimine Microfibers by Reactive Electrospinning with In Situ Photo-Cross-Linking by UV Radiation." Biomacromolecules, 2010, 11, 2283-2289 (published online on Aug. 6, 2010).*

(Continued)

*Primary Examiner* — Stuart Hendrickson
*Assistant Examiner* — Daniel Berns
(74) *Attorney, Agent, or Firm* — David M. Weisberg; Andrew T. Ward

(57) ABSTRACT

An adsorption-desorption material, in particular, crosslinked vinylepoxide-amine polymeric materials having an $M_w$ from about 500 to about $1\times10^6$, a total pore volume from about 0.2 cc/g to about 2.0 cc/g, and an adsorption capacity of at least about 0.2 millimoles adsorbed $CO_2$ per gram of adsorption-desorption material, and linear vinylepoxide-amine polymeric materials having an $M_w$ from about 140 to about $1\times10^6$, a total pore volume from about 0.2 cc/g to about 2.0 cc/g, and an adsorption capacity of at least about 0.2 millimoles adsorbed $CO_2$ per gram of adsorption-desorption material. This disclosure also relates to processes for preparing the crosslinked and linear vinylepoxide-amine materials, as well as to selective removal of $CO_2$ and/or other acid gases from a gaseous stream using the vinylepoxide materials.

6 Claims, 7 Drawing Sheets

Representative Epoxy/Amine Chemistry; R denotes vinyl functionality

(51) Int. Cl.
*B01J 20/22* (2006.01)
*C08J 9/26* (2006.01)
*B01D 53/02* (2006.01)
*B01D 53/62* (2006.01)
*C08G 73/02* (2006.01)
*C08J 9/28* (2006.01)
*B01D 53/04* (2006.01)
*B01D 53/047* (2006.01)

(56) References Cited

OTHER PUBLICATIONS

Alauzun et al., "CO2 as a Supramolecular Assembly Agent: A Route for Lamellar Materials with a High Content of Amine Groups", JACS, 127, 11204 (2005).

Sartori et al., "Sterically Hindered Amines for CO, Removal from Gases", Ind. Eng. Chem. Fundam., 22, 239 (1983).

Harlick et al., "Applications of Pore-Expanded Mesoporous Silica. 5. Triamine Grafted Material with Exceptional CO2 Dynamic and Equilibrium Adsorption Performance", Ind. Eng. Chem. Res., 46, 446 (2007).

Harlick et al., "Applications of Pore-Expanded Mesoporous Silicas. 3. Triamine Silane Grafting for Enhanced CO2 Adsorption", Ind. Eng. Chem. Res., 45, 3248 (2006).

Jadhav et al., "Monoethanol Amine Modified Zeolite 13X for CO2 Adsorption at Different Temperatures", Energy & Fuels, 21, 3555 (2007).

Gray et al., "Improved immobilized carbon dioxide capture sorbents", Fuel Processing Technology, 86, 1449 (2005).

Yue et al., "CO2 Capture by As-Prepared SBA-15 with an Occluded Organic Template", Adv. Fund. Mater. 16, 1717 (2006). ISSN: 1616-301X.

Li et al., "Preparation and Adsorption Properties of Polyethylenimine Containing Fibrous Adsorbent for Carbon Dioxide Capture", J. Appl. Poly. Sci., 108, 3851 (2008).

Hagg et al., "CO2 Capture from Natural Gas Fired Power Plants by Using Membrane Technology" Ind. Eng. Chem. Res., 44, 7668 (2005).

Zou et al., "CO2-selective polymeric membranes containing amines in crosslinked poly(vinyl alcohol)", J. Membr. Sci., 286, 310 (2006).

* cited by examiner

Illustrative Cross-linked Vinylepoxide-Amine Polymer Embodiment Synthesis

Representative Epoxy/Amine Chemistry; R denotes vinyl functionality

Preferred Vinyl and Non-Vinyl Monoepoxide Functional Compounds

Preferred Non-vinyl Diepoxide Functional Compounds

Preferred Non-vinyl Polymeric-Epoxide Functional Compounds poly(ethylene-co-glycidyl methacrylate)

poly[(o-cresyl glycidyl ether)-co-formaldehyde]

Poly(1,1,1,3,3,3-hexafluoroisopropyl methacrylate-co-glycidyl-methacrylate)

Preferred Non-vinyl Polymeric-Epoxide Functional Compounds

VINYLEPOXIDE-AMINE ACID GAS ADSORPTION-DESORPTION POLYMERS AND OLIGOMERS, PROCESSES FOR PREPARING SAME, AND USES THEREOF

This application claims the benefit of U.S. Provisional Application No. 61/426,232 filed Dec. 22, 2010.

BACKGROUND

1. Field of the Disclosure

This disclosure relates in part to adsorption-desorption materials, in particular, to crosslinked vinylepoxide-amine materials, and linear vinylepoxide-amine materials, and to processes for the preparation of these materials. This disclosure also relates in part to the use of these materials in the selective removal of $CO_2$ and/or other acid gases from a gaseous stream containing one or more of these gases.

2. Discussion of the Background Art

The selective removal of carbon dioxide from mixed gas streams is of great commercial value. Commercially, carbon dioxide may be used for reinjection into gas or liquid hydrocarbon deposits to maintain reservoir pressure and for enhanced product recovery. Due to the advanced age of many producing reservoirs worldwide and the ever-increasing challenge of meeting demand, the expanding use of enhanced oil recovery (EOR) methods is becoming more widespread.

Typically the source of carbon dioxide for EOR is the producing hydrocarbon stream itself, which may contain anywhere from less than 5% to more than 80% of $CO_2$.

Additionally, it is desired to capture $CO_2$ from flue gas of various combustion sources, where the stream contains less than about 15% of $CO_2$ and its temperature is relatively high. Yet another need for $CO_2$ capture technology is for the pre-combustion capture of $CO_2$ from shifted syngas produced in fuel gasification processes.

Conventional methods for $CO_2$ capture include cryogenic distillation/condensation, absorption using liquid solvents, such as amine scrubbing, or sorption using solid sorbents, such as pressure swing adsorption (PSA) and/or temperature swing adsorption (TSA). However, with present technologies, all of these processes require a large temperature decrease of the gas stream to enable $CO_2$ condensation or sorption. Conventional methods (PSA, TSA, amine scrubbing) require $CO_2$ uptake at relatively low temperatures (e.g., less than 50° C.). Sorbent/solvent regeneration ($CO_2$ desorption) is accomplished by a step change decrease in $CO_2$ partial pressure (PSA), and/or by a temperature increase to above about 100° C. (TSA, amine scrubbing). In all of these cases, $CO_2$ capture costs depend significantly on the required heat exchange capacities and energy requirements for gas cooling/heating, the costs for steam generation for $CO_2$ desorption, and the high equipment and energy costs associated with $CO_2$ recompression.

Conventional amine scrubbing is based on the chemistry of $CO_2$ with amines to generate carbonate/bicarbonate and carbamate salts. Commercially, amine scrubbing typically involves contacting the $CO_2$ and/or $H_2S$ containing gas stream with an aqueous solution of one or more simple amines (e.g., monoethanolamine). The process requires high rates of gas-liquid exchange and the transfer of large liquid inventories between the absorption and regeneration steps and high energy requirements for the regeneration of amine solutions. This process is challenged by the corrosive nature of the amine solutions. These challenges limit the economic viability for large-scale applications (e.g., large combustion sources and power plants) utilizing conventional technologies.

The growing need to incorporate carbon capture and sequestration (CCS) into fossil fuel-based power generation, has triggered accelerating research into alternatives to conventional amine scrubbing technology. Cyclic adsorption technologies (e.g., PSA and TSA) using solid adsorbents are also well-known in the gas purification industry. These processes avoid many of the limitations of amine scrubbing described above, but suffer from a lack of adsorbents having sufficiently selective $CO_2$ adsorption under the humid conditions always present in combustion flue gas, as well as the commercial viability of large scale operation.

Due to the ever increasing use of $CO_2$ re-injection for enhanced oil recovery, technology that reduces the cost of $CO_2$ capture directly reduces hydrocarbon production costs. In addition, if anticipated future restrictions on $CO_2$ emissions are mandated, a low cost method for $CO_2$ capture will be a critical need as a part of CCS.

Carbon dioxide is a ubiquitous and inescapable by-product of the combustion of hydrocarbons. In addition to the use of $CO_2$ for EOR, there is growing concern over its accumulation in the atmosphere and its role in global climate change. Therefore in addition to the commercial benefits of $CO_2$ recovery, environmental factors may soon require its capture and sequestration. For these reasons the separation of $CO_2$ from mixed gas streams is a rapidly growing area of research.

Therefore, a need exists for developing commercially viable alternative methods and adsorbent materials for the selective removal of $CO_2$ from gas mixtures, particularly adsorption technologies and adsorbent materials having economic viability for large-scale (e.g., large combustion sources and power plants) applications.

SUMMARY OF THE DISCLOSURE

This disclosure relates in part to an acid gas adsorption-desorption material comprising a crosslinked vinylepoxide-amine material having a weight average molecular weight of from about 500 to about $1 \times 10^6$, a total pore volume of from about 0.2 cubic centimeters per gram (cc/g) to about 2.0 cc/g, and an adsorption capacity of at least about 0.2 millimoles of $CO_2$ adsorbed per gram of adsorption-desorption material, or mixtures thereof. In preferred embodiments, the crosslinked polyvinyl-amine material is produced by adding a crosslinking agent selected from 1,2,5,6-diepoxycyclooctane, 1,2,7,8-diepoxyoctane, glycerol diglycidyl ether, bisphenol A diglycidyl ether, 1,4-butanediol diglycidyl ether, 1,4-cyclohexanedimethanol diglycidyl ether, bisphenol F diglycidyl ether, neopentyl glycol diglycidyl ether, 1,3-butadiene diepoxide, and poly(propylene glycol) diglycidyl ether (Mn of about 380 g/mol).

In a preferred embodiment of the acid gas adsorption-desorption material, the crosslinked vinylepoxide-amine material has a formula:

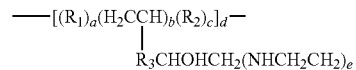

wherein a and c are integers equal to or greater than 0, and b, d, and e are integers equal to or greater than 1. The $NHCH_2CH_2$ groups can be linear or branched, and R1 and R2 are the same or different alkyl or aryl moieties, and R3 can be an alkyl or aryl moiety. The structure can be terminated with any of the starting vinyl monomers.

This disclosure also relates in part to an acid gas adsorption-desorption material comprising a linear vinylepoxide-amine material having a weight average molecular weight of from about 160 to about $1\times10^6$, a total pore volume of from about 0.2 cubic centimeters per gram (cc/g) to about 2.0 cc/g, and an adsorption capacity of at least about 0.2 millimoles of $CO_2$ adsorbed per gram of adsorption-desorption material, or mixtures thereof.

In a preferred embodiment, the linear vinylepoxide-amine material has a formula:

$$-[(R_1)_a(H_2CCH)_b(R_2)_c]_d-$$
$$|$$
$$R_3CHOHCH_2(NHCH_2CH_2)_e$$

wherein a and c are integers equal to or greater than 0, and b, d, and e are integers equal to or greater than 1. The $NHCH_2CH_2$ groups can be linear or branched, and R1 and R2 are the same or different alkyl or aryl moieties, and R3 can be an alkyl or aryl moiety This disclosure also relates in part to a process for preparing an acid gas adsorption-desorption material comprising a crosslinked vinylepoxide-amine material having a weight average molecular weight of from about 500 to about $1\times10^6$, a total pore volume of from about 0.2 cubic centimeters per gram (cc/g) to about 2.0 cc/g, and an adsorption capacity of at least about 0.2 millimoles of $CO_2$ adsorbed per gram of adsorption-desorption material, or mixtures thereof; said process comprising (i) reacting at least one vinylepoxide material comprised of at least one eopxide functional group and at least one vinyl functional group, with at least one organo-amine material under conditions sufficient to produce a vinyl-functionalized amine material, and (ii) crosslinking said vinyl-functionalized amine material under conditions sufficient to produce said crosslinked vinylepoxide-amine material.

This disclosure also relates in part to a process for preparing an acid gas adsorption-desorption material comprising a linear vinylepoxide-amine material having a weight average molecular weight of from about 160 to about $1\times10^6$, a total pore volume of from about 0.2 cubic centimeters per gram (cc/g) to about 2.0 cc/g, and an adsorption capacity of at least about 0.2 millimoles of $CO_2$ adsorbed per gram of adsorption-desorption material, or mixtures thereof; said process comprising reacting at least one vinylepoxide material comprised of at least one epoxide functional group and at least one vinyl functional group, with at least one organo-amine material under conditions sufficient to produce said linear vinylepoxide-amine material.

This disclosure also relates in part to a method for adsorption-desorption of an acid gas comprising:

contacting a gas mixture containing at least one acid gas with an adsorbent material under conditions sufficient to cause adsorption of at least a portion of said acid gas, said adsorbent material comprising (i) a crosslinked vinylepoxide-amine material having a weight average molecular weight of from about 500 to about $1\times10^6$, a total pore volume of from about 0.2 cubic centimeters per gram (cc/g) to about 2.0 cc/g, and an adsorption capacity of at least about 0.2 millimoles of $CO_2$ adsorbed per gram of adsorbent material, or mixtures thereof, or (ii) a linear vinylepoxide-amine material having a weight average molecular weight of from about 160 to about $1\times10^6$, a total pore volume of from about 0.2 cubic centimeters per gram (cc/g) to about 2.0 cc/g, and an adsorption capacity of at least about 0.2 millimoles of $CO_2$ adsorbed per gram of adsorbent material, or mixtures thereof; and treating said adsorbent material under conditions sufficient to cause desorption of at least a portion of said acid gas.

This disclosure also relates in part to a method of separating carbon dioxide from a gas mixture comprising:

providing at least one adsorption zone comprising an adsorbent, said adsorbent comprising (i) a crosslinked vinylepoxide-amine material having a weight average molecular weight of from about 500 to about $1\times10^6$, a total pore volume of from about 0.2 cubic centimeters per gram (cc/g) to about 2.0 cc/g, and an adsorption capacity of at least about 0.2 millimoles of $CO_2$ adsorbed per gram of adsorbent material, or mixtures thereof, or (ii) a linear vinylepoxide-amine material having a weight average molecular weight of from about 160 to about $1\times10^6$, a total pore volume of from about 0.2 cubic centimeters per gram (cc/g) to about 2.0 cc/g, and an adsorption capacity of at least about 0.2 millimoles of $CO_2$ adsorbed per gram of adsorbent material, or mixtures thereof;

passing said gas mixture comprising at least carbon dioxide through said at least one adsorption zone, wherein said adsorbent adsorbs at least part of the carbon dioxide from the mixture to provide a carbon dioxide-depleted gas; and regenerating said adsorbent by desorbing a carbon dioxide-rich gas.

The adsorbent materials useful in this disclosure have the advantage of recovery of $CO_2$ at low pressure, low capital costs, low propensity for corrosion, and low regeneration energy compared to conventional processes where a large amount of energy is required to heat the aqueous amine solution.

As used herein, "essentially isothermal conditions" means at or about the same temperature. In a preferred embodiment, the adsorption-desorption processes of this disclosure are carried out under essentially isothermal conditions.

Further objects, features and advantages of the present disclosure will be understood by reference to the following drawings and detailed description.

DETAILED DESCRIPTION OF THE PREFERRED EMBODIMENT

The acid gas adsorption-desorption materials of this disclosure comprise in part crosslinked vinylepoxide-amine polymeric materials. The crosslinked vinylepoxide-amine materials have a weight average molecular weight of from about 500 to about $1\times10^6$, preferably a weight average molecular weight of from about 600 to about $1\times10^5$, and more preferably a weight average molecular weight of from about $1\times10^3$ to about $5\times10^4$. The crosslinked vinylepoxide-amine materials have an adsorption capacity of at least about 0.2 millimoles of $CO_2$ adsorbed per gram of adsorption-desorption material, preferably an adsorption capacity of at least about 0.5 millimoles of $CO_2$ adsorbed per gram of adsorption-desorption material, and more preferably an adsorption capacity of at least about 1.0 millimoles of $CO_2$ adsorbed per gram of adsorption-desorption material. This disclosure also includes mixtures of the crosslinked vinylepoxide-amine materials.

Illustrative crosslinked vinylepoxide-amine materials of this disclosure have a formula selected from:

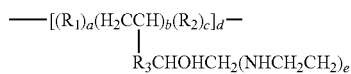

wherein a and c are integers equal to or greater than 0, and b, d, and e are integers equal to or greater than 1. The $NHCH_2CH_2$ groups can be linear or branched, and R1 and R2 are the same or different alkyl or aryl moieties, and R3 can be an alkyl or aryl moiety. The structure can be terminated with any of the starting vinyl monomers.

Figure 1:
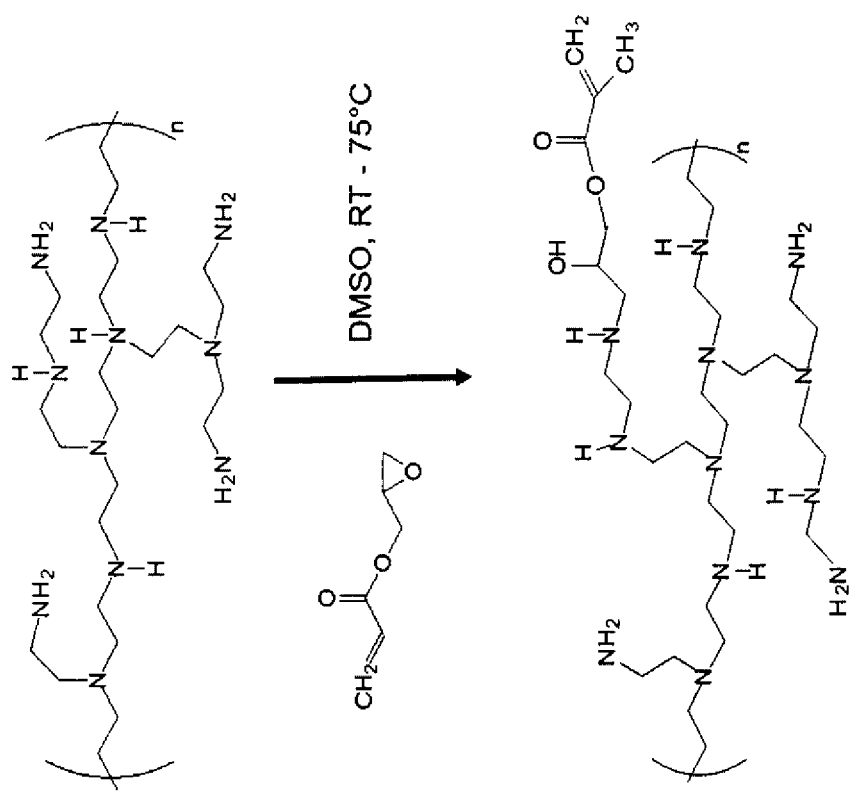
FIG. 1 depicts an approach for forming vinyl functionalized polyethyleneimines using vinylepoxide-amine chemistry.

A non-limiting, illustrative crosslinked vinylepoxide-amine material of this disclosure and synthesis is depicted in FIG. 1. The polyethyleneimine starting material is a commercially available, cationic flocculent, highly amine-rich building block. These materials can be formed as bulk solids, films, membranes, and particulates.

As used herein, "crosslinked" means polymer chains that are connected to one another through bonds. Crosslinks are bonds that link one polymer chain to another. When the polymer chains are connected to each other, they lose some of their ability to move as independent polymer chains.

Preferably the crosslinked vinylepoxide-amine polymer materials of this disclosure have an average particle diameter of from about 0.1 microns to about 500 microns, more preferably from about 1.0 microns to about 100 microns, and even more preferably from about 2.0 microns to about 50 microns. Preferably the crosslinked vinylepoxide-amine polymer materials of this disclosure have a total pore volume of from about 0.2 cubic centimeters per gram (cc/g) to about 2 cc/g, more preferably from about 0.4 cc/g to about 2 cc/g, and even more preferably from about 0.5 cc/g to about 2 cc/g, as measured by mercury porsimetry in cubic centimeters of pore volume per gram of the porous crosslinked vinylepoxide-amine materials, for all pores having a diameter of 0.005 microns to 10 microns.

Preferably the crosslinked vinylepoxide-amine polymer materials of this disclosure have an average pore size of from about 0.01 microns to about 1000 microns, more preferably from about 0.1 microns to about 100 microns, and even more preferably from about 1.0 microns to about 10 microns. Preferably the crosslinked vinylepoxide-amine polymer materials of this disclosure have a surface area of from about 5 square meters per gram ($m^2/g$) to about 50 $m^2/g$, more preferably from about 20 $m^2/g$ to about 50 $m^2/g$, and even more preferably from about 25 $m^2/g$ to about 50 $m^2/g$, as measured by mercury porsimetry.

The crosslinked vinylepoxide-amine materials of this disclosure can be prepared by a process that involves reacting at least one vinylepoxide material with at least one organo-amine material under conditions sufficient to produce the crosslinked vinylepoxide-amine material. In particular, the crosslinked vinylepoxide-amine materials can be produced by reacting at least one vinylepoxide functional compound with at least one linear amine, branched amine, polyamine, or mixtures thereof, under conditions sufficient to produce a vinyl-functionalized amine material which is then exposed to polymerization conditions to form the crosslinked vinylepoxide-amine material.

Figure 2:
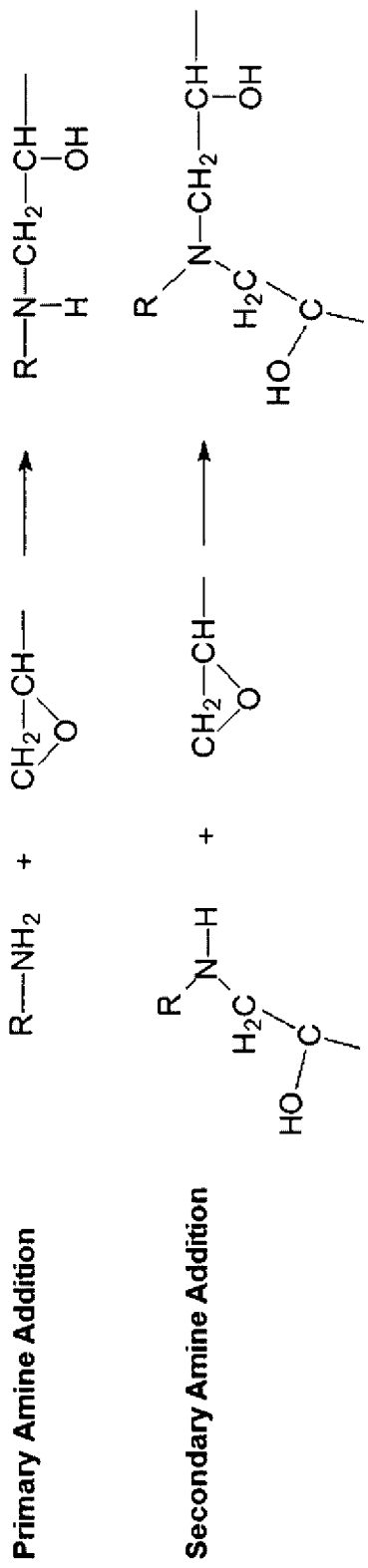
FIG. 2 depicts an approach for forming vinyl functionalized polyethyleneimines using vinylepoxide-amine chemistry utilizing primary and secondary amine starting materials.

FIG. 2 depicts an approach for forming hypercrosslinked polyethyleneimines using epoxy chemistry. In the reactions depicted in FIG. 2, primary amines react with epoxy compounds to produce secondary amines, and secondary amines react with epoxy compounds to produce tertiary amines (with corresponding alcohol groups). The approach is applicable for forming functionalized, lightly or moderately crosslinked, polyamines. Many combinations are permissible, for example, functionality modifications (mono-, di-, tri- and tetra-) and geometric modifications (linear, branched, dendritic, and hyperbranched). The products can have a wide range of structures, functionalities and crosslink densities.

Figure 3:
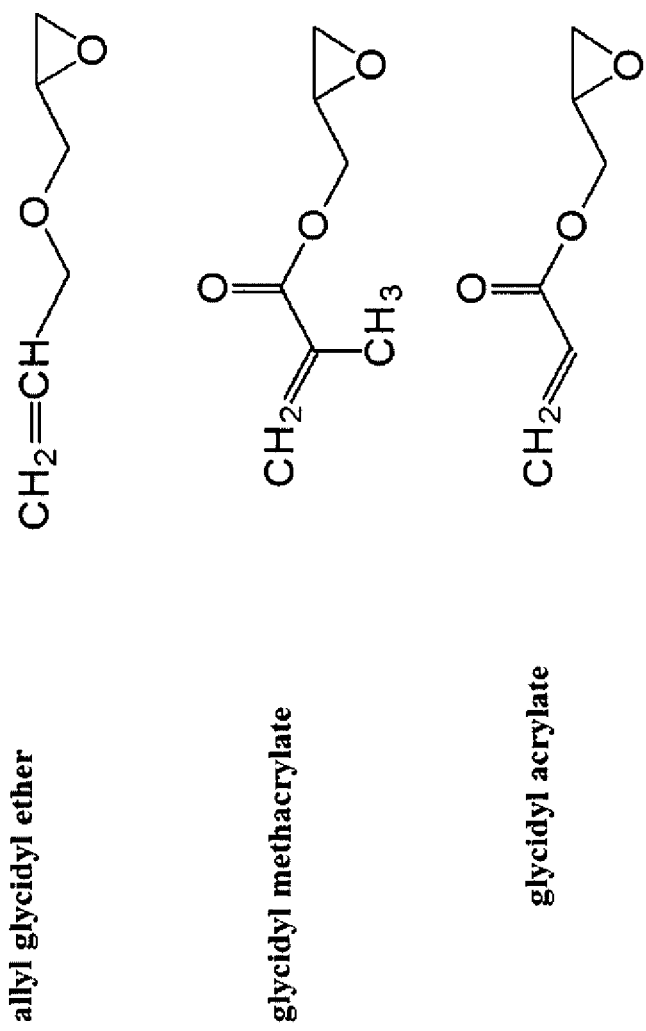
FIG. 3 depicts some preferred vinyl monoepoxide starting materials for use in making the vinylepoxide-amine materials of invention.

Illustrative vinylepoxide starting materials useful in making the crosslinked vinylepoxide-amine materials of this disclosure may be selected from a wide variety of materials known in the art. The vinylepoxide materials herein can be either monomers or polymers that are comprised of at least one vinyl functional group and at least one epoxide functional group. The vinylepoxide materials can comprise aromatic vinylepoxides. Illustrative vinylepoxide materials include, for example, vinylmonoepoxy functional compounds, vinyldiepoxy functional compounds, vinyltriepoxy functional compounds, vinyltetraepoxy functional compounds, and mixtures thereof. Preferably, the vinylepoxide starting material is a vinyl monoepoxide selected from allyl glycidyl ether, glycidyl methacrylate, and glycidyl acrylate. These compounds are structurally illustrated in FIG. 3. The vinylepoxide materials can be prepared by conventional methods known in the art and/or are commercially available.

Illustrative organo-amine starting materials useful in making the crosslinked vinylepoxide-amine materials of this disclosure may be selected from a wide variety of materials known in the art. Illustrative amine materials include, for example, primary amines, secondary amines, and mixtures thereof. Suitable polyamines include, for example, linear polyamines, branched polyamines, polyalkyleneimines, and mixtures thereof. Preferably, the amine is selected from propylenediamine, tetraethylenepentaamine, branched and linear polyethyleneimines, and mixtures thereof. The amine materials can be prepared by conventional methods known in the art and/or are commercially available.

A wide variation of polyethyleneimine crosslinkers can be useful in this disclosure. Crosslinker modifications and network functionality can provide enhanced performance. The crosslinker structure can be varied (tri-/tetra-functional crosslinkers) as well as the crosslink density. Monofunctional reactants can be incorporated as potential structure disruptors and/or pore modifiers for functionality control. Illustrative crosslinkers include, for example, 1,2,5,6-diepoxycyclooctane, 1,2,7,8-diepoxyoctane, glycerol diglycidyl ether, bisphenol A diglycidyl ether, 1,4-butanediol diglycidyl ether, 1,4-cyclohexanedimethanol diglycidyl ether, bisphenol F diglycidyl ether, neopentyl glycol diglycidyl ether, 1,3-butadiene diepoxide, polypropylene glycol) diglycidyl ether (Mn of about 380 g/mol), and the like.

One or more porogens may also be used as a component material in the fabrication processes and crosslinked polymers of this disclosure. An interpenetrating network of holes, closed cells or a combination thereof can be achieved in the crosslinked polymers of this disclosure by polymerization in the presence of an insoluble material such as a porogen. Subsequent removal of the porogen gives rise to interstices throughout the formed crosslinked polymer material. Porogen concentrations in the range of from about 1.0 weight percent to about 75 weight percent, preferably from about 5 weight percent to about 50 weight percent, and more preferably from about 10 weight percent to about 30 weight percent, with respect to the overall reaction mixture, should be sufficient for most processes. Illustrative porogens include, for example, xylene, toluene, polyvinylpyrrolidinone, and mixtures thereof. The porogens can be prepared by conventional methods known in the art and/or are commercially available.

The concentration of the vinylepoxide starting material in the process of this disclosure can vary over a wide range, and need only be that minimum amount necessary to react with the organo-amine starting material. The resulting material can be further polymerized to form higher molecular weight vinylepoxide-amine polymer materials. In general, depending on the size of the reaction mixture, vinylepoxy starting material concentrations in the range of from about 1 weight percent to about 75 weight percent, preferably from about 5 weight percent to about 50 weight percent, and more preferably from about 10 weight percent to about 30 weight percent, with respect to the overall reaction mixture, should be sufficient for most processes.

The concentration of the organo-amine starting material in the process of this disclosure can vary over a wide range, and need only be that minimum amount necessary to react with the vinylepoxide starting material. In general, depending on the size of the reaction mixture, amine starting material concentrations in the range of from about 1 weight percent to about 75 weight percent, preferably from about 5 weight percent to about 50 weight percent, and more preferably from about 10 weight percent to about 30 weight percent, with respect to the overall reaction mixture, should be sufficient for most processes.

The concentration of the crosslinkers in the process of this disclosure can vary over a wide range, and need only be that minimum amount necessary to achieve desired crosslinking in the crosslinked epoxy-amine materials of this disclosure. In general, depending on the size of the reaction mixture, concentrations of crosslinkers in the range of from about 0.5 weight percent to about 50 weight percent, preferably from about 1.0 weight percent to about 40 weight percent, and more preferably from about 2.0 weight percent to about 30 weight percent, with respect to the overall reaction mixture, should be sufficient for most processes.

The concentration of the one or more porogens in the process of this disclosure can vary over a wide range, and need only be that minimum amount necessary to achieve desired pore volume in the crosslinked epoxy-amine polymer materials of this disclosure. In general, depending on the size of the reaction mixture, concentrations of porogens in the range of from about 1.0 weight percent to about 75 weight percent, preferably from about 5 weight percent to about 50 weight percent, and more preferably from about 10 weight percent to about 30 weight percent, with respect to the overall reaction mixture, should be sufficient for most processes.

Reaction conditions for the reaction of the vinylepoxide starting material with the organo-amine starting material, such as temperature, pressure and contact time, may vary greatly. Any suitable combination of such conditions may be employed herein that are sufficient to produce the crosslinked vinylepoxide-amine materials of this disclosure. Preferred reaction pressure is ambient pressure. Preferred reaction temperatures can range from about 0° C. to about 150° C., preferably from about 25° C. to about 95° C. The preferred reaction time of the epoxy material with the amine can range from about 60 seconds to about 48 hours. In an embodiment, the reaction is carried out under ambient pressure and the contact time may vary from a matter of seconds or minutes to a few hours or greater. The reactants can be added to the reaction mixture or combined in any order. The stir time employed is preferably from about 1 minute to about 48 hours, more preferably from about 1 to about 24 hours, and even more preferably from about 2 to about 8 hours. Isolation of the crosslinked vinylepoxide-amine materials may be achieved by any techniques known in the art, such as solvent evaporation or nonsolvent extraction and other conventional procedures, to afford the final material.

The acid gas adsorption-desorption materials of this disclosure comprise in part linear vinylepoxide-amine polymeric materials. The linear vinylepoxide-amine materials have a weight average molecular weight of from about 140 to about $1 \times 10^6$, preferably a weight average molecular weight of from about 400 to about $1 \times 10^5$, and more preferably a weight average molecular weight of from about 600 to about $1 \times 10^4$. The linear vinylepoxide-amine materials have an adsorption capacity of at least about 0.2 millimoles of $CO_2$ adsorbed per gram of adsorption-desorption material, preferably an adsorption capacity of at least about 0.5 millimoles of $CO_2$ adsorbed per gram of adsorption-desorption material, and more preferably an adsorption capacity of at least about 1.0 millimoles of $CO_2$ adsorbed per gram of adsorption-desorption material. This disclosure also includes mixtures of the linear vinylepoxide-amine materials.

Illustrative linear vinylepoxide-amine materials of this disclosure have a formula selected from:

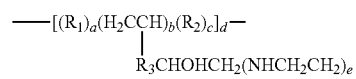

wherein a and c are integers equal to or greater than 0, and b, d, and e are integers equal to or greater than 1. The $NHCH_2CH_2$ groups can be linear or branched, and R1 and R2 are the same or different alkyl or aryl moieties, and R3 can be an alkyl or aryl moiety. The structure can be terminated with any of the starting vinyl monomers.

The composition of the linear vinylepoxide-amine materials of this disclosure, including all polymers, copolymers and terpolymers thereof, can vary over a wide range, and need only be that amount necessary to provide the desired adsorption-desorption properties. These materials can be formed as bulk solids, films, membranes, and particulates.

Preferably the linear vinylepoxide-amine polymer materials of this disclosure have an average particle diameter of from about 0.1 microns to about 500 microns, more preferably from about 1.0 microns to about 100 microns, and even more preferably from about 2.0 microns to about 50 microns. Preferably the linear vinylepoxide-amine polymer materials of this disclosure have a total pore volume of from about 0.2 cubic centimeters per gram (cc/g) to about 2 cc/g, more preferably from about 0.4 cc/g to about 2 cc/g, and even more preferably from about 0.5 cc/g to about 2 cc/g, as measured by mercury porsimetry in cubic centimeters of pore volume per gram of the porous linear vinylepoxide-amine materials, for all pores having a diameter of 0.005 microns to 10 microns.

Preferably the linear vinylepoxide-amine polymer materials of this disclosure have an average pore size of from about 0.01 microns to about 1000 microns, more preferably from about 0.1 microns to about 100 microns, and even more preferably from about 1.0 microns to about 10 microns. Preferably the linear vinylepoxide-amine polymer materials of this disclosure have a surface area of from about 5 square meters per gram (m$^2$/g) to about 50 m$^2$/g, more preferably from about 20 m$^2$/g to about 50 m$^2$/g, and even more preferably from about 25 m$^2$/g to about 50 m$^2$/g, as measured by mercury porsimetry.

The linear vinylepoxide-amine materials of this disclosure can be prepared by a process that involves reacting at least one vinylepoxide material with at least one organo-amine material under conditions sufficient to produce the linear vinylepoxide-amine material. In particular, the linear vinylepoxide-amine materials can be produced by reacting at least one vinyl monoepoxy functional compound, vinyl diepoxy functional compound, vinyl triepoxy functional compound, vinyl tetraepoxy functional compound, or mixtures thereof, with at least one linear amine, or mixtures thereof, under conditions sufficient to produce the linear vinylepoxide-amine material. In a more preferred embodiment, the linear vinylepoxide-amine materials can be produced by reacting at least one vinyl monoepoxy functional compound with at least one linear amine compound.

Illustrative vinylepoxide starting materials useful in making the linear vinylepoxide-amine materials of this disclosure may be selected from a wide variety of materials known in the art. The vinylepoxide materials herein can be either monomers or polymers that are comprised of at least one vinyl functional group and at least one epoxy functional group. Illustrative vinylepoxide materials include, for example, vinylmonoepoxy functional compounds, vinyldiepoxy functional compounds, vinyltriepoxy functional compounds, vinyltetraepoxy functional compounds, and mixtures thereof. Preferably, the vinylepoxide starting material is a vinyl monoepoxide selected from allyl glycidyl ether, glycidyl methacrylate, and glycidyl acrylate. These compounds are structurally illustrated in FIG. 3. The vinylepoxide materials can be prepared by conventional methods known in the art and/or are commercially available.

Illustrative amine starting materials useful in making the linear vinylepoxide-amine materials of this disclosure may be selected from a wide variety of materials known in the art. Illustrative amine starting materials include, for example, primary amines, secondary amines, and mixtures thereof. Suitable polyamines include, for example, linear polyamines, branched polyamines, polyalkyleneimines, and mixtures thereof. Preferably, the amine is selected from propylenediamine, tetraethylenepentaamine, linear polyethyleneimines, and mixtures thereof. The amine starting materials can be prepared by conventional methods known in the art and/or are commercially available.

One or more porogens may also be used as a component material in the fabrication processes and linear polymers of this disclosure. An interpenetrating network of holes, closed cells or a combination thereof can be achieved in the linear polymers of this disclosure by polymerization in the presence of an insoluble material such as a porogen. Subsequent removal of the porogen gives rise to interstices throughout the formed linear polymer material. Porogen concentrations in the range of from about 1.0 weight percent to about 75 weight percent, preferably from about 5 weight percent to about 50 weight percent, and more preferably from about 10 weight percent to about 30 weight percent, with respect to the overall reaction mixture, should be sufficient for most processes. Illustrative porogens include, for example, xylene, toluene, polyvinylpyrrolidinone, and mixtures thereof. The porogens can be prepared by conventional methods known in the art and/or are commercially available.

The concentration of the vinylepoxide starting material in the process of this disclosure can vary over a wide range, and need only be that minimum amount necessary to react with the amine starting material and to provide the linear vinylepoxide-amine materials of this disclosure. In general, depending on the size of the reaction mixture, vinylepoxide starting material concentrations in the range of from about 1 weight percent to about 75 weight percent, preferably from about 5 weight percent to about 50 weight percent, and more preferably from about 10 weight percent to about 30 weight percent, with respect to the overall reaction mixture, should be sufficient for most processes.

The concentration of the organo-amine starting material in the process of this disclosure can vary over a wide range, and need only be that minimum amount necessary to react with the vinylepoxide starting material and to provide the linear vinylepoxide-amine materials of this disclosure. In general, depending on the size of the reaction mixture, organo-amine starting material concentrations in the range of from about 1 weight percent to about 75 weight percent, preferably from about 5 weight percent to about 50 weight percent, and more preferably from about 10 weight percent to about 30 weight percent, with respect to the overall reaction mixture, should be sufficient for most processes.

The concentration of the one or more porogens in the process of this disclosure can vary over a wide range, and need only be that minimum amount necessary to achieve desired pore volume in the linear vinylepoxide-amine polymer materials of this disclosure. In general, depending on the size of the reaction mixture, concentrations of porogens in the range of from about 1.0 weight percent to about 75 weight percent, preferably from about 5 weight percent to about 50 weight percent, and more preferably from about 10 weight percent to about 30 weight percent, with respect to the overall reaction mixture, should be sufficient for most processes.

Reaction conditions for the reaction of the vinylepoxide starting material with the organo-amine starting material, such as temperature, pressure and contact time, may vary greatly. Any suitable combination of such conditions may be employed herein that are sufficient to produce the linear vinylepoxide-amine materials of this disclosure. Preferred reaction pressure is less than 100 psig. More preferably, the reaction pressure is approximately ambient (atmospheric) pressure. Preferred reaction temperatures can range from about 0° C. to about 150° C., more preferably from about 25° C. to about 95° C. The preferred reaction time of the vinylepoxide material with the organo-amine can range from about 60 seconds to about 48 hours. In an embodiment, the reaction is carried out under ambient pressure and the contact time may vary from a matter of seconds or minutes to a few hours or greater. The reactants can be added to the reaction mixture or combined in any order. The stir time employed is preferably from about 1 minute to about 48 hours, more preferably from about 1 to about 24 hours, and even more preferably from about 2 to about 8 hours. Isolation of the linear vinylepoxide-amine materials may be achieved by any techniques known in the art, such as solvent evaporation, nonsolvent extraction, and other conventional methods, to afford the final material. Chemical crosslinking of the vinyl-containing monomers can be completed via well-known free radical initiators and are commercially available. Examples include: azonitriles, azo-derivatives, alkyl peroxides, acyl peroxides, hydroperoxides, ketone peroxides, peresters, peroxy carbonates, and the like.

In addition to the vinylepoxides described above, epoxide-functionalized homopolymers, copolymers, terpolymers and the like may also be utilized in making the polyvinyl-amine polymers of the present invention. Preferred epoxide-functionalized additives include: poly(glycidyl methacrylate), poly(styrene-co-glycidyl methacrylate), poly(methacrylate-co-glycidyl methacrylate), poly(styrene-co-glycidyl acrylate), and poly(styrene-co-allyl glycidyl ether). Other monomer components include: styrenics, methacrylates, acrylates, vinyl chloride, acrylic acid, styrene sulfonate, maleic anhydride, reaction products of maleic anhydride (amines, alcohols), olefins, acrylamides, acrylonitrile, vinyl acetates, butadiene, alpha olefins, pyridine, vinyl fluoride, vinyl stearate, vinyl isobutyl ether, vinyl methyl ketone, vinyl octadecyl ether, vinyl benzoic acid, vinylidene chloride, methyl methacrylate, isoprene, ethylene, propylene, n-vinyl pyrrolidone, vinyl-containing liquid crystal monomers, vinyl-containing ionic liquid monomers, vinyl fluoride, vinyl imidazoles, alkenes, acrylamido-2-methylpropane sulfonic acid (and neutralized versions), maleic acid, vinyl alkyl ethers, vinyl sulfonic acid (and neutralized versions), vinyl silanes, other vinyl containing monomers known to those well-versed in the art, macromonomers (examples: vinyl terminated polystyrene, vinyl terminated methacrylates, vinyl terminated poly(ethyleneoxide), vinyl terminated polyolefins, vinyl terminated polydimethylsiloxanes), divinyl functionalized monomers, and combinations of the above monomers.

Figure 4:
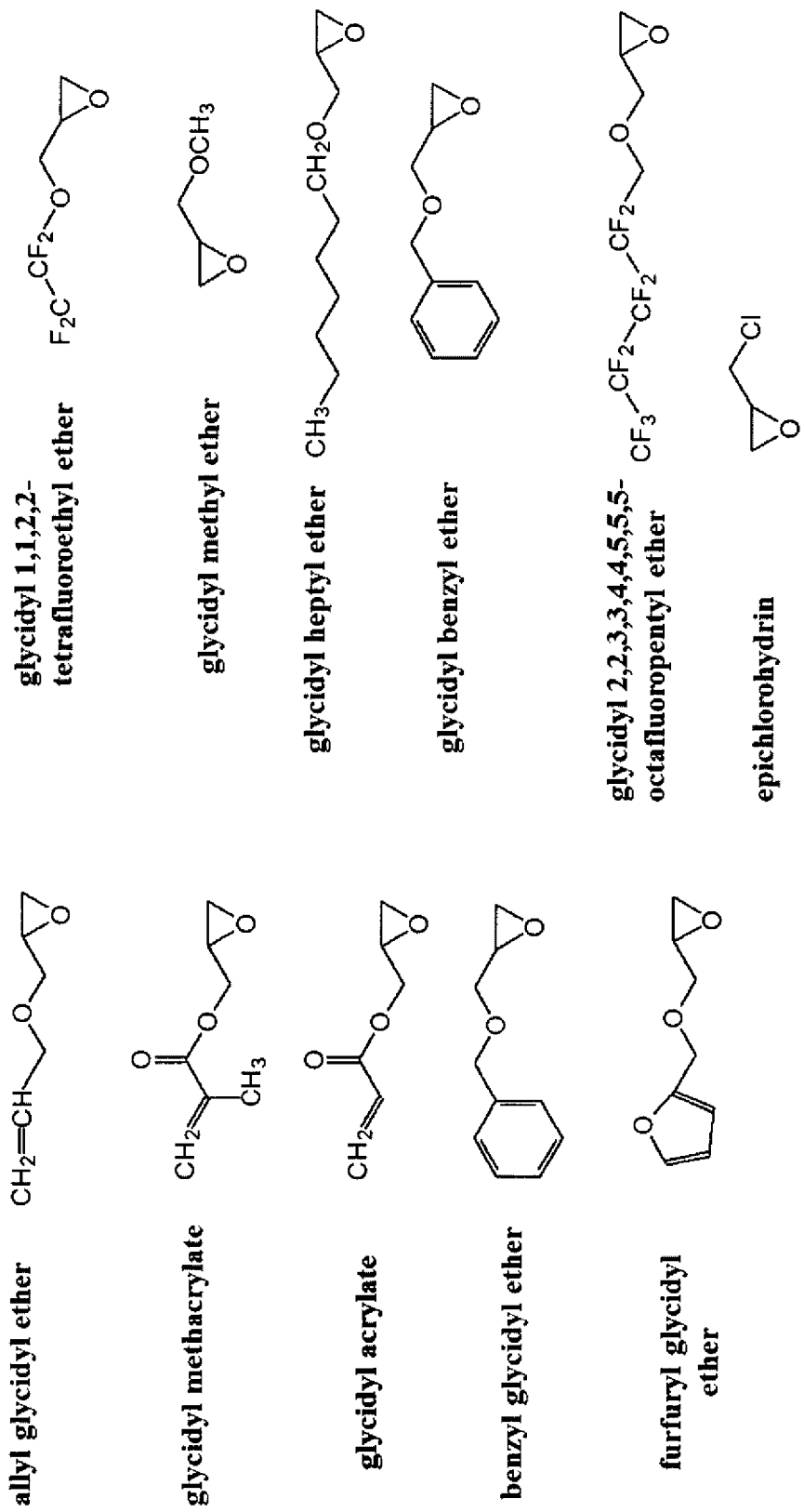
FIG. 4 depicts some preferred non-vinyl and vinyl-monoepoxide starting materials for use in making the vinylepoxide-amine materials of invention.

In addition to the vinylepoxides described above, in other preferred embodiments, "non-vinyl" monoepoxide functional compounds may be added to make the polymer. These materials are utilized to add certain functionality to the resulting vinylepoxide-amine polymer and/or provide terminating (or "end-capping") structures to the resulting vinylepoxide-amine polymer. Preferred non-vinyl monoepoxide functional compounds are selected from benzyl glycidyl ether, furfuryl glycidyl ether, gliycidyl 1,1,2,2-tetrafluoroethyl ether, glycidyl methyl ether, glcidyl heptyl ether, bisphenol A (2,3-dihydroxypropyl) glycidyl ether, gliycidyl 2,2,3,3,4,4,5,5-octofluoropentyl ether, and epichlorohydrin. These compounds are structurally illustrated in FIG. 4.

Figure 5:
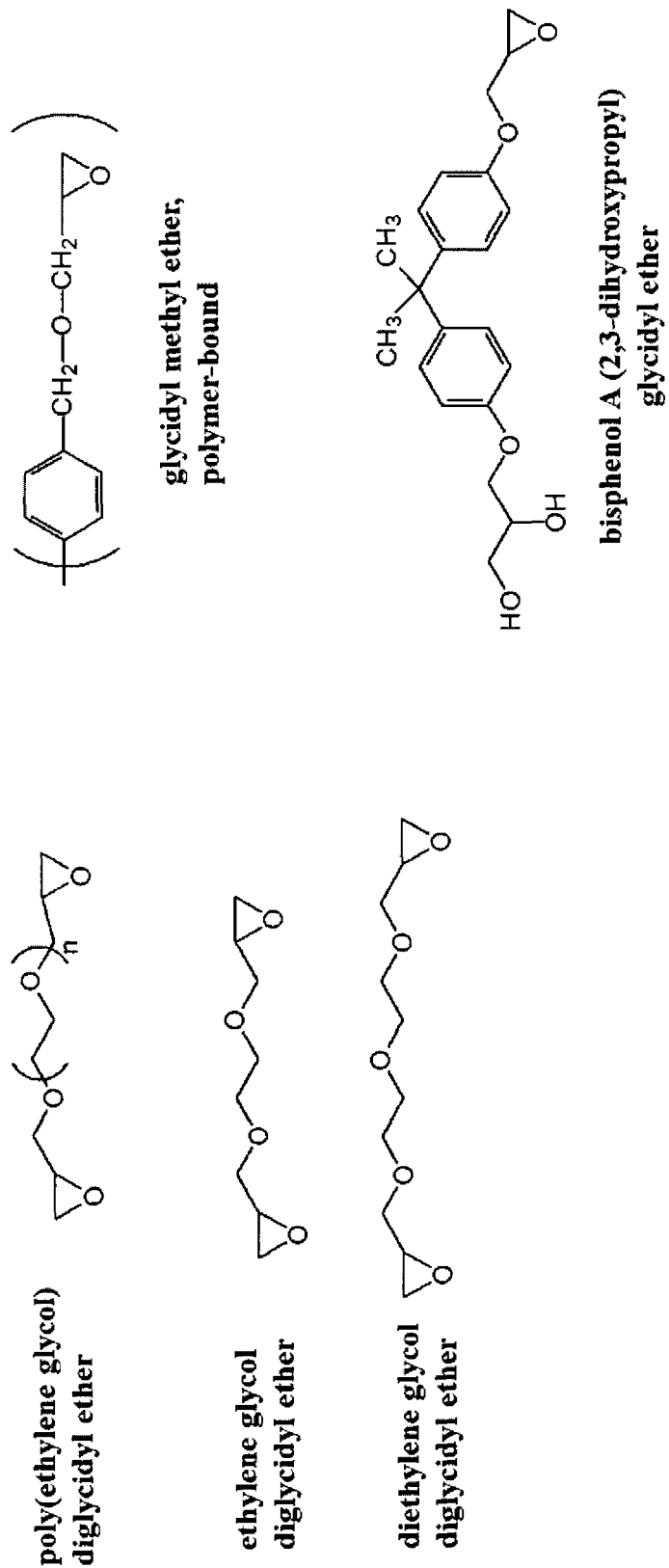
FIG. 5 depicts some preferred non-vinyl diepoxide starting materials for use in making the vinylepoxide-amine materials of invention.

In addition to the vinylepoxides described above, in other preferred embodiments, "non-vinyl" diepoxide functional compounds may be added to make the polymer. These materials may be utilized to add certain functionality to the resulting vinylepoxide-amine polymer and can also be utilized chemically crosslink the amine/polyamine structures within the resulting vinylepoxide-amine polymer. Preferred non-vinyl diepoxide functional compounds are selected from ethylene glycol diglycidyl ether, poly(ethylene glycol) diglycidyl ether, diethylene glycol diglycidyl ether, and resorcinol diglycidyl ether. These compounds are structurally illustrated in FIG. 5. In a similar manner, triepoxide and tetraepoxide functional compounds can also be utilized to crosslink the resulting vinylepoxide-amine polymer.

Figure 6:
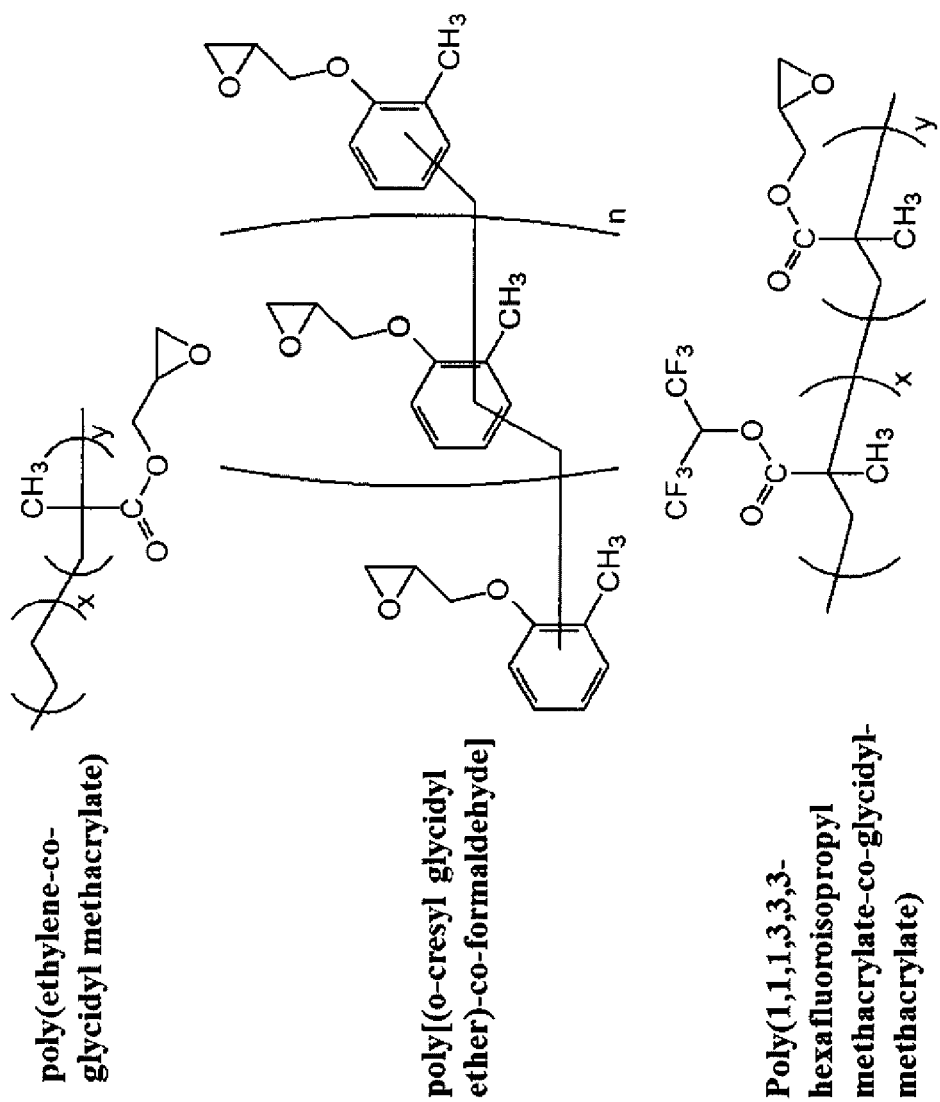
FIGS. 6 & 7 depict some preferred non-vinyl polymeric-epoxide starting materials for use in making the vinylepoxide-amine materials of invention.
Figure 7:
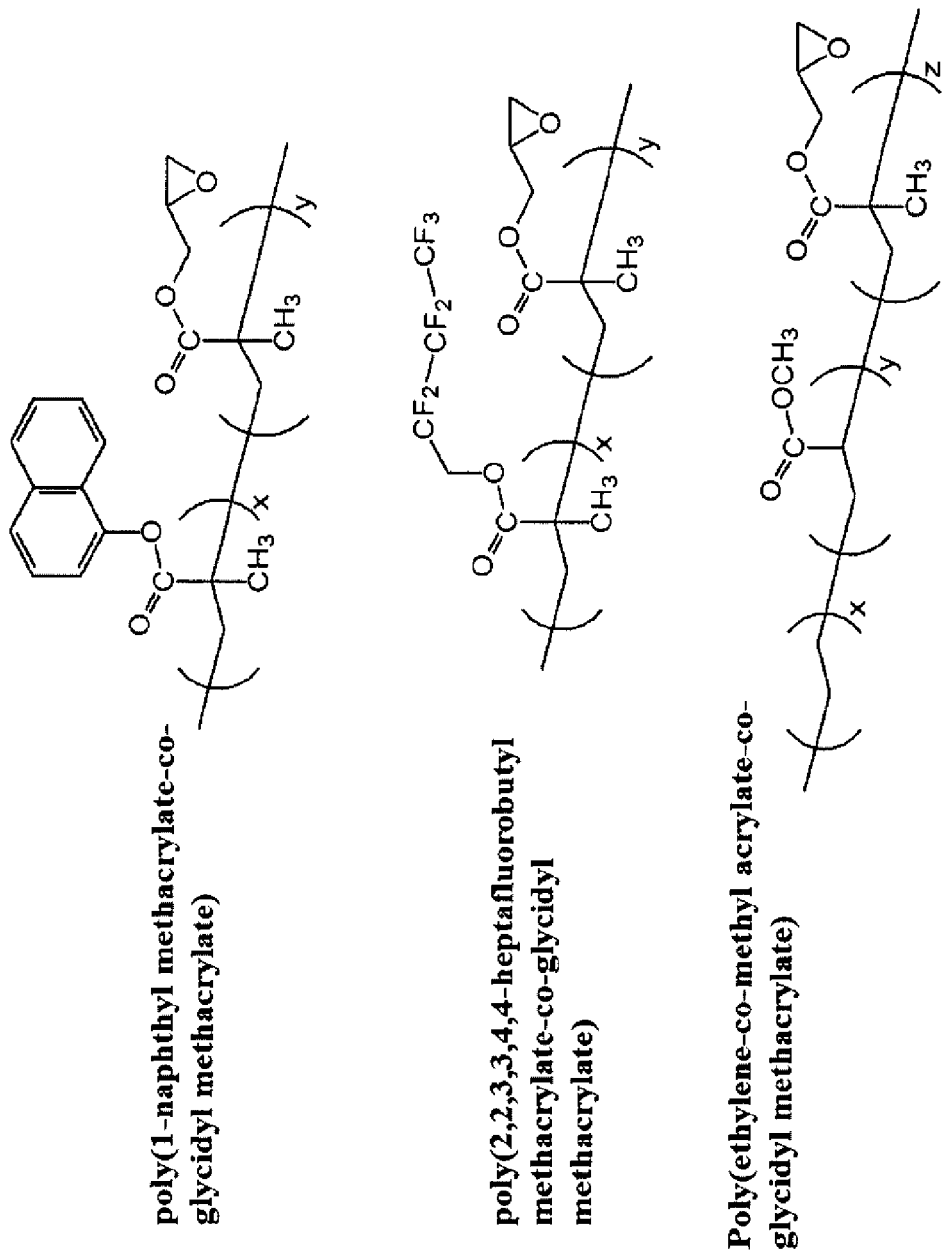

In addition to the vinylepoxides described above, in other preferred embodiments, "non-vinyl" polymeric-epoxide functional compounds may be added to make the polymer. These materials may be utilized to add certain functionality to the resulting vinylepoxide-amine polymer and can also be utilized chemically crosslink the amine/polyamine structures within the resulting vinylepoxide-amine polymer. Preferred non-vinyl polymeric-epoxide functional compounds are selected from poly(ethylene-co-gycidyl methacrylate), polymer bound glycidyl methyl ether, poly[(o-cresyl glycidyl ether)-co-formaldehyde], poly(1,1,1,3,3,3-hexafluoroisopropyl methacrylate-co-gylcidyl-methacrylate), poly(1-naphthyl methacrylate-co-gycidyl methacrylate), poly(2,2,3, 3,4,4-heptafluorobutyl methacrylate-co-gycidyl methacrylate), and poly(ethylene-co-methylacrylate-co-gycidyl methacrylate). These compounds are structurally illustrated in FIGS. 6 and 7.

In addition to the above compounds and materials, a wide variety of nonionic, anionic, cationic, and reactive monomers can be useful components to the vinylepoxide-amine adsorbent materials herein. Non-limiting examples of useful nonionic monomers are acrylamide, 1-vinylimidazole, and 1-vinyl-1,2,4-triazole. A non-limiting example of a useful anionic monomer is acrylic acid. A non-limiting example of a useful cationic monomer is (vinylbenzyl)trimethylammonium chloride.

Non-limiting examples of useful reactive monomers include vinyl chloride, vinylidene, vinyl fluoride, vinyl acetate, vinyl stearate, vinyl isobutyl ether, vinyl methyl ketone, vinyl octadecyl ether, vinyl benzoic acid, vinyl imidazoles, vinyl sulfonic acid, vinyl silanes, acrylic acid, styrene sulfonate, maleic anhydride, acrylonitrile, butadiene, pyridine, methyl methacrylate, isoprene, ethylene, propylene, n-vinyl pyrrolidone, alkenes, acrylamido-2-methylpropane sulfonic acid, and maleic acid. More preferred, the reactive monomers are selected from methacrylates, styrenics, acetates, silanes, anionic and cationic monomers. Other non-limiting examples of useful reactive monomers include styrenes, methacrylates, acrylates, acrylamides, olefins, vinyl-containing liquid crystal monomers, vinyl-containing ionic liquid monomers, alkenes, vinyl alky ethers, and divinyl functionalized monomers. Related vinyl oligomers, such as vinyl terminated polystyrene, vinyl terminated methacrylates, vinyl terminated poly(ethyleneoxide), vinyl terminated polyolefins, and vinyl terminated polydimethylsiloxanes, may also be used as reactive components for polymerization. Additionally, blends of any of the above mentioned compounds polymeric materials are also included in the compositional range envisioned in this invention.

The method of this disclosure involves removing $CO_2$ and/or other acid gases, such as $H_2S$, from a gaseous stream containing one or more of these gases. The method of this disclosure is based on the selective adsorption of a gas mixture and involves contacting the gas mixture with a selective adsorbent in an adsorption zone. The adsorption zone is maintained at adsorption conditions (i.e., temperature and/or pressure) favorable to selectively adsorbing a component of the gas mixture and producing an adsorption effluent, which has reduced concentration of the adsorbed component relative to the gas mixture. Subsequently, the adsorbed component is then desorbed by changing the conditions in the adsorption zone to induce desorption. Alternatively, the selective adsorbent can be moved from the adsorption zone to a desorption zone having conditions favorable for desorption. Under desorption conditions, at least a portion of the adsorbed component is desorbed from the selective adsorbent. Following the desorptive step, the adsorption zone may be further purged with a purge gas to further remove the adsorbed component.

Once the vinylepoxide-amine adsorbent material has been synthesized, it can be employed in a sorbent bed for use in a adsorption-desorption process. Preferably, the adsorbent of this disclosure may be formed into a stable, mechanically strong form. These forms may include, for example, pellet forms or monolithic structures. The selection of the appropriate form is based on the application of the adsorbent and the type of equipment used. After the adsorbent form is selected and manufactured, it is used in a sorbent bed where a gaseous stream containing $CO_2$ contacts the adsorbent. In the adsorption process, the $CO_2$ and amine chemically react to form an amine complex, thereby removing the $CO_2$ from the gaseous stream.

After the adsorbent is loaded with $CO_2$ to a satisfactory level, for example, when greater than 80 percent of the amine has been converted to the amine complex, or at a designated cycle time, the adsorbent can be regenerated. Regeneration involves ceasing the flow of the gaseous stream through the bed and desorbing the adsorbed $CO_2$. The desorption can be accomplished by controlled temperature swing, pressure swing, partial pressure swing, or by the use of a sweeping or purge gas, or any combination thereof. During this step, the amine complex is dissociated, and $CO_2$ removed and the amine is freed and ready for re-use. In a preferred embodiment, the adsorption-desorption is carried out under essentially isothermal conditions.

The adsorbent material of this disclosure comprises a crosslinked vinylepoxide-amine material or a linear vinylepoxide-amine material. Suitable crosslinked vinylepoxide-amine materials and linear vinylepoxide-amine materials of this disclosure are described more fully herein.

The vinylepoxide-amine adsorbent material has an adsorption capacity of at least about 0.2 millimoles, preferably at least about 0.5 millimoles, and more preferably at least about 1.0 millimoles, of $CO_2$ adsorbed per gram of adsorbent when measured by a thermal gravimetric apparatus using a dry gas stream containing $CO_2$ (about 0.7 atmosphere partial pressure) and an inert gas. The adsorbent can be regenerated from one cycle to another in cycling adsorption processes, and thus the adsorbent is cyclically stable.

The adsorption beds can be configured in a variety of ways, for example, moving beds and fixed beds. The configuration is preferably fixed bed wherein the bed is fixed relative to the flow of the feed stream through the bed. In a moving bed configuration, the adsorbent in the adsorption bed and the gas mixture move through the adsorption zone in a continuous manner. Then the adsorbent is moved from the adsorption zone into the desorption zone.

In the preferred fixed bed configuration, the bed is fixed in a certain area of the cyclic adsorption apparatus and contains the adsorbent. The gas mixture passes through the fixed bed while under adsorption zone conditions. After a period of time when the adsorbent adsorbs a portion of the gas mixture, the conditions are changed in the area that includes the fixed bed to desorption zone conditions to desorb the adsorbed gases. Many cyclic adsorption apparatus configurations can include two or more fixed beds in separate regions or the apparatus, so that while one fixed bed is under adsorption conditions, the other fixed bed is under desorption conditions. Therefore, the gas stream can be operated in a continuous manner.

In general, for temperature swing adsorption processes, the temperature in the adsorption zone is lower than the temperature in the desorption zone, while the pressure is substantially constant. For pressure swing adsorption processes, the pressure in the adsorption zone is greater than the pressure of the desorption zone, while the temperature is substantially constant.

The temperature of the adsorption zone for cyclic adsorption processes depends upon a number of factors, such as the particular hydrocarbons present in the gas mixture being separated, the particular adsorbent being used, and the pressure at which the adsorption step is carried out. The upper and lower temperatures at which the adsorption zone is maintained is, in part, determined by both economics and the chemical reactivity of the components in the gas mixture. In particular, the temperature at which the adsorption zone is maintained should be below the temperature at which the gas mixture components undergo chemical reaction (e.g., hydrocarbons undergoing oligomerization and polymerization).

For the adsorption processes of this disclosure, the temperature of the inlet stream is preferably in the range of from about 20° C. to about 80° C. In a preferred embodiment, the adsorption-desorption is carried out under essentially isothermal conditions. The pressure during adsorption is preferably in the range of from about 0.1 bar to about 300 bar (absolute), more preferably from about 0.1 bar to about 150 bar (absolute). The partial pressure of carbon dioxide in the gas mixture is preferably from about 0.1 to about 150 bar, more preferably from about 0.1 to about 20 bar, and even more preferably from about 0.1 to about 10 bar (absolute). The gas mixture can be contacted with the adsorbent bed material at a gas hourly space velocity (GHSV) of from about 200 to about 50,000 GHSV. The gas mixture can be contacted with the adsorbent material in the processes of this disclosure one or more times.

The carbon dioxide can be desorbed from the adsorbent material by any conventional methods. One possibility is to desorb the carbon dioxide by means of a helium purge. Other possibilities include pressure swing adsorption including partial pressure swing adsorption, thermal swing adsorption, rapid cycle partial pressure swing adsorption, or any combination thereof.

For desorption, suitable pressures can range from preferably about 50 millibar to about 75 bar (absolute), more preferably from about 50 millibar to about 3 bar (absolute), even more preferably from about 100 millibar to about 1.5 bar (absolute). The temperature is preferably in the range of from about 50° C. to about 150° C., more preferably from about 75° C. to about 125° C., and even more preferably greater than about 80° C. In a preferred embodiment, the adsorption-desorption is carried out under essentially isothermal conditions.

For temperature swing adsorption processes, adsorbent regeneration is carried out at a temperature higher than the adsorption temperature and below the temperature at which undesired reactions of the components of the gas mixture take place. For temperature swing adsorption processes, the adsorbent regeneration temperature is typically in the range of about 40° C. to less than about 200° C., preferably from about 60° C. to about 140° C. The pressures at which the adsorption and adsorbent regeneration steps are carried out are not critical for temperature swing adsorption processes, and in general these steps can be carried out at any of the usual pressures employed for cyclic adsorption processes.

It is understood that the adsorbent is not limited to use for the removal of $CO_2$ from a gaseous stream. Rather the adsorbent can be used for the removal of any acid gas, or combination thereof, from a gaseous stream, provided that the acid gas is capable of reaction with amines.

The gas mixture containing carbon dioxide can originate from a natural or artificial source. The gas mixture can contain in addition to carbon dioxide, one or more other gases such as methane, ethane, n-butane, i-butane, hydrogen, carbon monoxide, ethene, ethyne, propene, nitrogen, oxygen, helium, neon, argon, krypton, and hydrogen sulfide.

The constituents of the gas mixture may have different proportions. The amount of carbon dioxide in the gas mixture is preferably at least 1 percent by volume, more preferably at least 10 percent by volume, and even more preferably 50 percent by volume or greater. The gas mixture can be any of a variety of gases, for example, natural gas, flue gas, fuel gas, waste gas and air.

The contacting of the gas mixture can be carried out by continuous adsorption on a fixed bed. The gas mixture is passed through the fixed adsorbent bed. Continuous adsorption can take place in two or more adsorbent beds in which at least one of the adsorbent beds contains the crosslinked vinylepoxide-amine material or linear vinylepoxide-amine material or a combination thereof.

It will be appreciated that conventional equipment can be used to perform the various functions of the cyclic processes, such as monitoring and automatically regulating the flow of gases within the cyclic adsorption system so that it can be fully automated to run continuously in an efficient manner.

Various modifications and variations of this disclosure will be obvious to a worker skilled in the art and it is to be understood that such modifications and variations are to be included within the purview of this application and the spirit and scope of the claims.

While we have shown and described several embodiments in accordance with our disclosure, it is to be clearly understood that the same may be susceptible to numerous changes apparent to one skilled in the art. Therefore, we do not wish to be limited to the details shown and described but intend to show all changes and modifications that come within the scope of the appended claims.

What is claimed is:

1. An acid gas adsorption-desorption material comprising a crosslinked vinylepoxide-amine material having a weight average molecular weight of from about 500 to about $1 \times 10^6$, a total pore volume of from about 0.2 cubic centimeters per gram (cc/g) to about 2.0 cc/g, and an adsorption capacity of at least about 0.2 millimoles of $CO_2$ adsorbed per gram of adsorption-desorption material, or mixtures thereof; wherein said crosslinked vinylepoxide-amine material is produced by reacting at least one vinylepoxide material comprised of at least one epoxide functional group and at least one vinyl functional group, with at least one organo-amine, said at least one organo-amine comprising a linear amine, a branched amine, a polyamine, or mixtures thereof, under conditions sufficient to produce said crosslinked vinylepoxide-amine material; wherein said at least one vinylepoxide is comprised of an aromatic vinylepoxide.

2. The acid gas adsorption-desorption material of claim 1 wherein said at least one organo-amine comprises a primary amine, a secondary amine, or mixtures thereof, and said polyamine comprises a linear polyamine, a branched polyamine, or mixtures thereof.

3. The acid gas adsorption-desorption material of claim 1 wherein said crosslinked vinylepoxide-amine material contains about 5 weight percent to about 50 weight percent vinylepoxide starting materials based on the weight of the final material.

4. The acid gas adsorption-desorption material of claim 1 wherein said crosslinked vinylepoxide-amine material is produced by adding a crosslinking agent selected from 1,2,5,6-diepoxycyclooctane, 1,2,7,8-diepoxyoctane, glycerol diglycidyl ether, bisphenol A diglycidyl ether, 1,4-butanediol diglycidyl ether, 1,4-cyclohexanedimethanol diglycidyl ether, bisphenol F diglycidyl ether, neopentyl glycol diglycidyl ether, 1,3-butadiene diepoxide, and poly(propylene glycol) diglycidyl ether (Mn of about 380 g/mol).

5. The acid gas adsorption-desorption material of claim 1 wherein said crosslinked vinylepoxide-amine material has a formula:

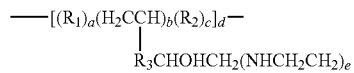

wherein a and c are integers equal to or greater than 0, and b, d, and e are integers equal to or greater than 1, wherein the $NHCH_2CH_2$ groups can be linear or branched, and R1 and R2 are the same or different alkyl or aryl moieties, and R3 can be an alkyl or aryl moiety.

6. The acid gas adsorption-desorption material of claim 5 wherein said crosslinked vinylepoxide-amine material is in the form of particles with an average particle diameter of from about 0.1 microns to about 500 microns.

* * * * *